(12) United States Patent
Haney et al.

(10) Patent No.: US 7,526,159 B2
(45) Date of Patent: Apr. 28, 2009

(54) METHOD AND APPARATUS FOR COUPLING SPATIAL LIGHT MODULATORS

(75) Inventors: Michael W. Haney, Oak Hill, VA (US); Michael J. McFadden, McLean, VA (US); Muzammil Iqbal, San Diego, CA (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 11/611,522

(22) Filed: Dec. 15, 2006

(65) Prior Publication Data

US 2007/0147842 A1   Jun. 28, 2007

Related U.S. Application Data

(63) Continuation of application No. PCT/US2005/021466, filed on Jun. 17, 2005.

(60) Provisional application No. 60/580,399, filed on Jun. 18, 2004.

(51) Int. Cl.
*G02B 6/26* (2006.01)
*G02B 6/42* (2006.01)
*G02B 6/10* (2006.01)

(52) U.S. Cl. .............................. 385/33; 385/31; 385/129

(58) Field of Classification Search .................. 385/31, 385/33, 129
See application file for complete search history.

(56) References Cited

U.S. PATENT DOCUMENTS 5,612,171 A   3/1997   Bhagavatula

| 5,710,652 | A   | 1/1998  | Bloom et al.           |
|-----------|-----|---------|------------------------|
| 5,760,950 | A   | 6/1998  | Maly et al.            |
| 5,761,350 | A   | 6/1998  | Koh                    |
| 5,999,670 | A   | 12/1999 | Yoshimura et al.       |
| 6,763,052 | B2  | 7/2004  | Huang et al.           |
| 7,197,201 | B2* | 3/2007  | Nakaya et al. ...... 385/14 |

OTHER PUBLICATIONS

Goossen, K. W. et al., "GaAs MQW Modulators Integrated with Silicon CMOS," *IEEE Photonics Technology Letters*,7:4, pp. 360-362, Apr. 1995.

Kley, E-B. "Continuous Profile Writing by Electron and Optical Lithography," *Microelectronic Engineering*,34, pp. 261-298, 1997.

Iqbal, M. et al., "Intrachip Global Interconnects and the Saturation of Moore's Law," *Proceedings of IEEE-LEOS Summer Top.*,IEEE 2004.

McFadden, M. J. et al., "Multiscale Free-Space Optical Interconnects for Intrachip Global Communication: Motivation, Analysis and Experimental Validation," *Applied Optics*,45:25, pp. 6358-6366, Sep. 2006.

Haney et al., "An Application Specific Interconnect Fabric (ASIF) for Free-Space Global Optical Intrachip Interconnects," Optical Society of America, 2000.

(Continued)

*Primary Examiner*—Frank G Font
*Assistant Examiner*—Erin D Chiem
(74) *Attorney, Agent, or Firm*—RatnerPrestia (57) ABSTRACT

A method and apparatus for waveguide-based and free space based optical interconnection in integrated circuits that includes an input optical waveguide with etched end-facets, an output optical waveguide with an end-facets and modulators and detectors.

3 Claims, 7 Drawing Sheets

OTHER PUBLICATIONS

Co-Pending U.S. Appl. No. 11/611,414, filed Dec. 15, 2006.

Haney et al, "Arbitrarily Configurable Optical Interconnect Fabric for Intrachip Global Communication" Proceedings of the IPAC03, Maui, Hawaii, USA, Jul. 6-11 2003.

McFadden et al., "Multi-Scale Free-Space Optical Interconnects for Intrachip Global Communications" Proceedings of IEEE-LEOS Summer Topical: Workshop on Optical interconnects & VLSI Photonics, San Diego, CA, Jul. 28-30, 2004.

Haney et al., "Intrachip Optical Interconnects: Challenges and Possible Solutions," Proceedings of the ICO, Tokyo, Japan, Jul. 12-15, 2004.

McFadden et al., "Towards Demonstrating Multi-scale Free-Space Optical Interconnects for Intrachip Global Communications," Proceedings of OSA 88th Annual Meeting, Rochester, NY, Oct. 2004.

Baukens et al., "Design and Optimization of VCSEL-based Micro-optical Relay Systems: Bringing Optical Information to Silicon Chips," Proceedings of SPIE—vol. 4455—Micro- and Nano-optics for Optical Interconnection and Information Processing pp. 209-220, Dec. 2001.

Thienpont et al., "Demonstration of a Monolithic Micro-Optical Bridge for Free-Space Intrachip Interconnects," OSA Summer Topical Meeting on Diffractive Optics and Micro-Optics, OSA Technical Digest Series, vol. 10 pp. 108-110, 1998.

Kobrinsky et al., "On-Chip Optical Interconnects," Intel Technology Journal: Optical Technologies and Applications; vol. 8, Issue 2 May 10, 2004.

Written Opinion of the International Search Authority for International Application No. PCT/US2005/021466 dated Jan. 3, 2006.

International Search Report Section C for International Application No. PCT/US2005/021466 dated Jan. 3, 2006.

\* cited by examiner

METHOD AND APPARATUS FOR COUPLING SPATIAL LIGHT MODULATORS

CROSS REFERENCE TO RELATED APPLICATIONS

This Application is a Continuation under 35 USC 120 of International Application PCT/US05/021466 filed on Jun. 17, 2005. Application PCT/US05/021466 claims benefit of U.S. Application 60/580,399 filed on Jun. 18, 2004. The entire contents of these applications are incorporated herein by reference.

STATEMENT REGARDING FEDERALLY SPONSORED RESEARCH

The U.S. Government has a paid-up license in the present invention and the right in limited circumstances to require the patent owner to license others on reasonable terms as provided for by contract as awarded by DARPA MTO under Grant MDA972-00-1-0023 awarded to Brown University OE-Center.

BACKGROUND

The disclosure is directed toward applications for very short reach optical interconnects, such as intrachip or chip-to-chip communications, where power consumption, reliability and yield requirements cannot be met by existing semiconductor laser technologies.

The number and density of integrated circuit devices that require interconnection at the intrachip level continues to grow at a furious pace in accordance with Gordon Moore's famous prediction (i.e., the number of transistors per square inch on integrated circuits has doubled every 18 months since the integrated circuit was invented). Research into the projected saturation of integrated circuit technology, due to the physical limitations and scaling behavior of electrical wires, has highlighted the need to investigate unconventional solutions, such as optical interconnects, to allow continued progress.

Analysis suggests that such optical interconnects can provide configurable and scalable solutions for intrachip and chip-to-chip global communications while significantly improving bandwidth, delay, noise, and real-estate consumption for next generation VLSI systems. However, several expert authors have claimed that optical interconnects are not practical for very short reach applications. This claim is primarily due to the unavailability of low cost, high-density, high-yield and reliable optical sources. Existing semiconductor laser technologies are targeted for long haul/reach communications applications and provide high optical power. In contrast, short reach applications, such as between points on a chip in multi-chip modules (MCM), where the maximum path length is on the order of centimeters, do not require such high optical power, but need high-reliability, high density of sources and sinks, low heat dissipation and low cost.

Background art discloses that high-density arrays of modulators, such as Multiple Quantum Well Modulators (MQWMs), have been fabricated that provide high-yield, low-power operation and extended mean-time-to-failure (MTTF). However, using modulators efficiently in an optical architecture requires a method and apparatus for coupling to and from the modulated effective source.

Further, background art modulator-based optical interconnect methods use spot array generators and a beam splitter to couple light to modulators. However, with these background art methods, the space above the plane of the modulators is at least partially obstructed, making integration with interconnect fabrics difficult. In addition, the regular pattern of a spot array generator does not allow arbitrary placement of the source points.

Therefore, there is a need in the art for methods and apparatus coupling an external optical source to modulators to create high density and low electrical power consumption optical sources and sinks that can be efficiently coupled to optical interconnect systems.

SUMMARY

The disclosure provides an efficient method for using modulators in applications that normally require surface-normal photonic emitters (e.g., surface-emitting lasers or light-emitting diodes (LEDs)). The invention can also address applications that would use waveguide-embedded edge-emitting sources (e.g. distributed Bragg reflector or Fabry-Perot lasers). Moreover, the disclosure is a method and apparatus for patterning dense, arbitrarily located, effective photonic sources and detectors that would be useful for applications where high optical power is not required, but where low electrical power consumption, low heat dissipation, high density, high reliability, and low cost are instead the more critical parameters.

The disclosure provides a method and apparatus for coupling light from a single continuous wave (CW) laser or LED source to several modulators, utilizing waveguides, splitters and etched 45° waveguide end facets that provide individually addressable, surface-normal and narrowly-diverging effective optical sources and sinks.

Further, the disclosure is a method and apparatus for integrating optical waveguides with spatial light modulators (e.g., MQWMs) to create effective photonic sources and detectors that can be readily integrated in free-space or guided-wave optical interconnect fabrics. Moreover, the disclosure lends itself to easy integration with both free-space and guided-wave optical interconnect fabrics.

In the disclosure, light is coupled normally (perpendicularly from above) to a reflection mode spatial light modulator, which reflects it or absorbs it according to its drive signal. When the light is reflected, it emits perpendicularly through the substrate and emulates the behavior of a surface-emitting photonic source, such as a surface-emitting laser or LED. For this reason, the disclosure may be called a Perpendicularly Emitting, Normally Coupled Emulated Laser (PENCEL) structure.

One embodiment of the disclosure is an apparatus comprising: an input waveguide which may be split into a plurality of separate guides, each with a plurality of etched end-facets on one side of a substrate, and a plurality of microlenses on the other side. In a non-limiting example of the disclosure, a first etched end-facet of the waveguide reflects the light from the waveguide perpendicularly through the substrate and a first microlens that collects the light onto a reflection-mode modulator. Further, when the modulator is "on," the light propagates back through the microlens, emulating the behavior of a surface-normal photonic emitter (e.g., a surface-emitting laser or LED). Furthermore, the first microlens may be designed so that the light emits into free-space, or the microlens can be designed to focus the light onto a second etched end-facet of an output waveguide located adjacent to the input waveguide. The output waveguide then propagates the light to a third etched end-facet that reflects the light onto a second microlens that collects the light onto a detector.

Another embodiment of the invention is an apparatus for optical interconnect comprising: at least one of a waveguide-based apparatus further comprising: an input optical waveguide, wherein said input optical waveguide has a first end-facet etched at −45° relative to a top surface of the input optical waveguide; a substrate; at least one first lens; a two-dimensional array of at least one of modulators and detectors; an output optical waveguide, wherein the output optical waveguide has a second end-facet etched at −135° at the input end and a third end-facet etched at −45° relative to a top surface of the output optical waveguide at the output end; and at least one second lens, wherein the second lens collects light reflected from the third end-facet onto a detector; and a free-space optical interconnect apparatus comprising: an input optical waveguide, wherein said input optical waveguide has a first end-facet etched at −45° relative to a top surface of the input optical waveguide; a substrate; at least one first lens; a two-dimensional array of at least one of a plurality of modulators and detectors; at least one second lens, wherein the second lens collect incident light from free-space onto a detector.

Yet another embodiment of the disclosure comprises a method for optical interconnect comprising: at least one of a method for waveguide-based optical connection further comprising: generating light from an external light source; coupling the light through coupling means to an input optical waveguide, wherein the input optical waveguide has a first end-facet etched at −45° relative to a top surface of the input optical waveguide; splitting the external light source using splitters; reflecting the split external light source light with the first end-facet through a substrate and a microlens onto a modulator; collecting the light from the microlens onto a modulator; collecting the light onto a modulator; reflecting the light from the modulator back through the microlens and the substrate into a second end-facet etched at −135° relative to a top surface of an output optical waveguide when the modulator is activated to reflect; reflecting the light into the output optical waveguide with the second end-facet located at the input to the second optical waveguide; reflecting the light with a third end-facet located at the output end of the output optical waveguide through the substrate and onto a second lens; and collecting the light onto a detector with the second lens, and a free-space optical interconnect method further comprising: generating light from an external light source; coupling the light through coupling means to an optical waveguide, wherein the optical waveguide has a first end-facet etched at −45° relative to a top surface of the optical waveguide; reflecting the light from the splitters with the end-facet through a substrate and a microlens onto a modulator, wherein the modulator reflects when active; reflecting the light from the end-facet through a microlens onto a modulator; collecting the light onto the modulator; reflecting the light back from the modulator and through the microlens and the substrate and into free-space when the modulator is active; collecting light incident on the substrate from free-space with a second lens; and detecting the incident light from free-space that is collected by the second lens onto a detector.

DETAILED DESCRIPTION

Figure 1A:
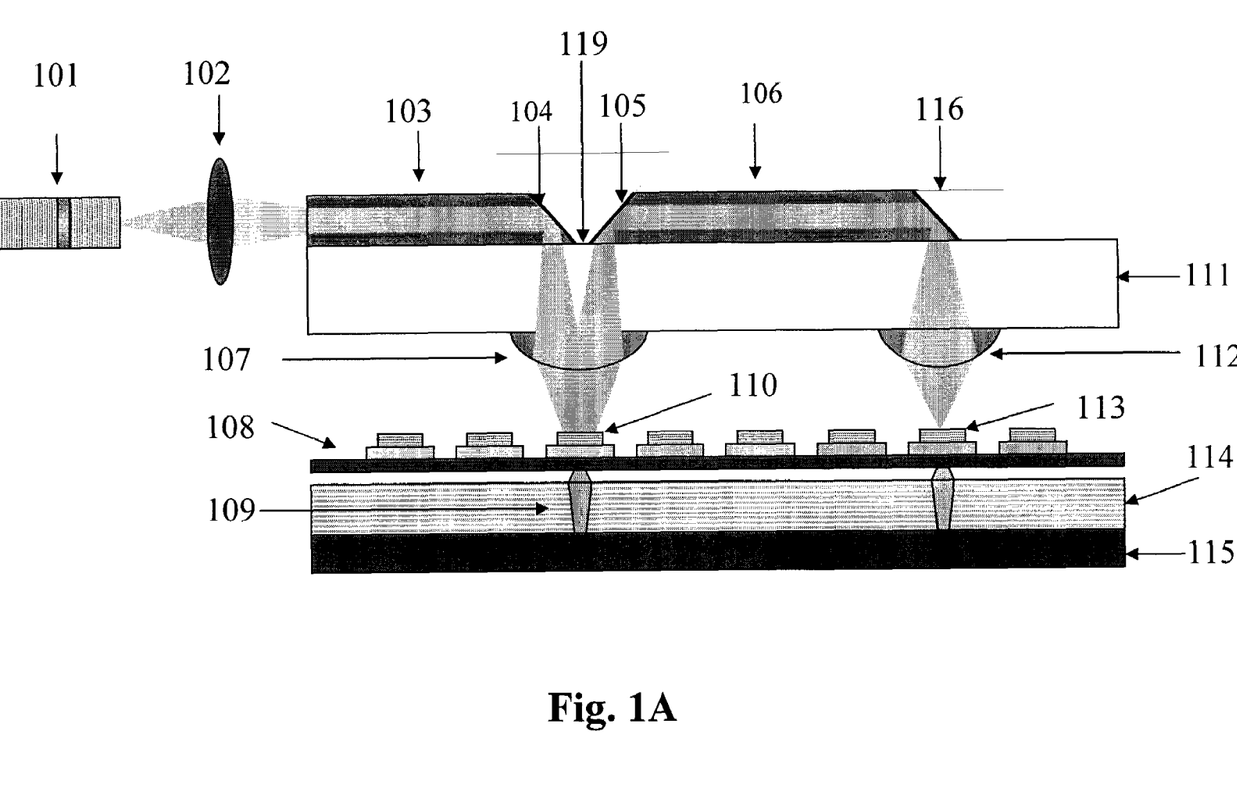
FIG. 1A is an exemplary schematic of a side view of a first embodiment of the apparatus of the disclosure.

In one exemplary embodiment of the apparatus of the disclosure, the waveguide and modulator are located relative to one another, as shown in FIG. 1A. In particular, FIG. 1A shows the apparatus of the invention in a waveguide-based interconnect application. In FIG. 1A, an external light source 101 that provides an input for the apparatus of the invention. Examples of external light sources include, but are not limited to, lasers and LEDs. The external light source 101 is coupled by coupling means 102 to an input optical waveguide 103. Examples of coupling means 102 include, but are not limited to, a ball lens, butt coupling, end fire coupling, thin lens, prism coupling, and grating coupling of the external light source 101 to the input optical waveguide 103. The input optical waveguide 103 has a first end-facet 104. The first end-facet 104 is preferably etched at −45° relative to a top surface of the input optical waveguide 103. Light from the external source 101 is reflected by the first end-facet 104 through a substrate 111 and a lens 107 and onto a modulator 110. The lens 107 may include, but is not limited to a microlens. When the modulator 110 is on, the modulator 110 reflects the light from the external source 101 back through the lens 107 and the substrate 111 to a second end-facet 105. The second end-facet 105 is preferably etched at −135° relative to a top surface of an output optical waveguide 106.

The lens 107 may be preferably designed to couple light from the input optical waveguide 103 to the modulator 110 and back into the output optical waveguide 106. The apparatus of FIG. 1A may also include a two-dimensional array of optoelectronic spatial light modulators 108, which may be used as either sources 110 or detectors 113. The first end-facet 104 and second end-facet 105 may be separated by a predetermined gap 119. This predetermined gap 119 is preferably in the range from 0 to several waveguide widths. As discussed above, a plurality of modulators 110 may also be biased to perform as a detector 113 and may be configured in a two-dimensional array. The apparatus may also include multiple metallization layers 114 below the optoelectronic device layer and include vias 109 and driver circuitry to supply drive current to the modulators. Moreover, the apparatus may also include a CMOS or other logic layer 115 below the multiple metallization layers.

As a particular example of the disclosure, as shown in FIG. 1A, light from a continuous wave (CW) external source 101 can be coupled into an input waveguide 103 on a substrate 111. The light from the input waveguide can be coupled to and from a reflection mode modulator 110 at an arbitrary location using a pair of etched end-facets 104 and a lens 107 on the bottom of the substrate. When the modulator is "on," the light can be coupled into an adjacent output waveguide 106, which can be routed as an optical link to a detection point, and coupled to the detector 113 using another etched end-facet 116 and a lens 112 on the bottom side of the substrate 111, which collects the light onto the detector 113.

Figure 1B:
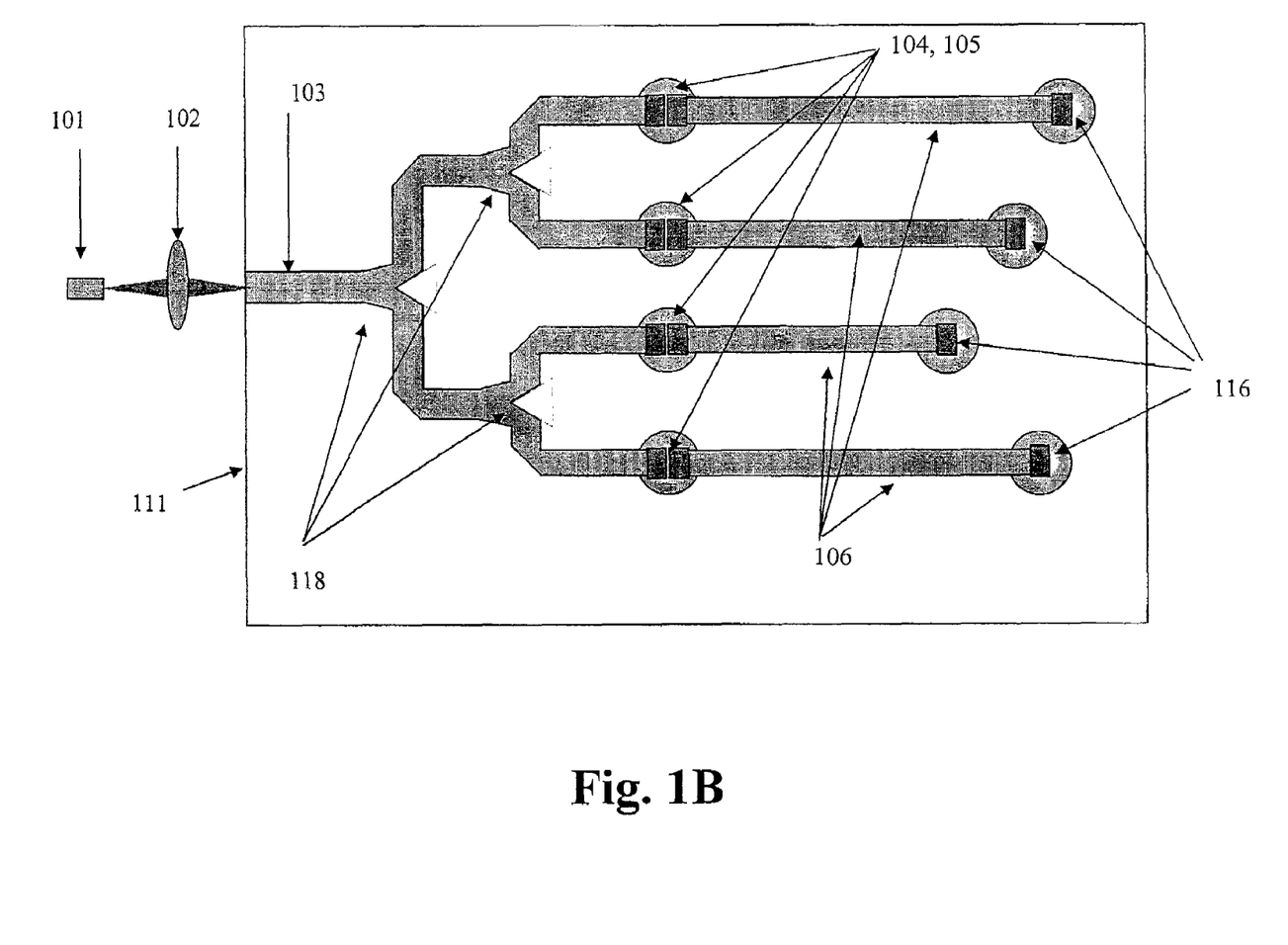
FIG. 1B is an exemplary schematic of a top view of a first embodiment of the apparatus of the disclosure.

Moreover, FIG. 1B shows a top view of the invention of FIG. 1A. As shown in FIG. 1B, the single CW source 101 can be split 118 and guided to multiple individually addressable, arbitrarily located effective source points (i.e., modulators 110). In addition, the modulators 110 can be biased as detectors 113, as shown in FIG. 1A, thus allowing a single device to be integrated as both sources (i.e., modulators 110) and sinks (i.e., detectors 113).

Figure 2A:
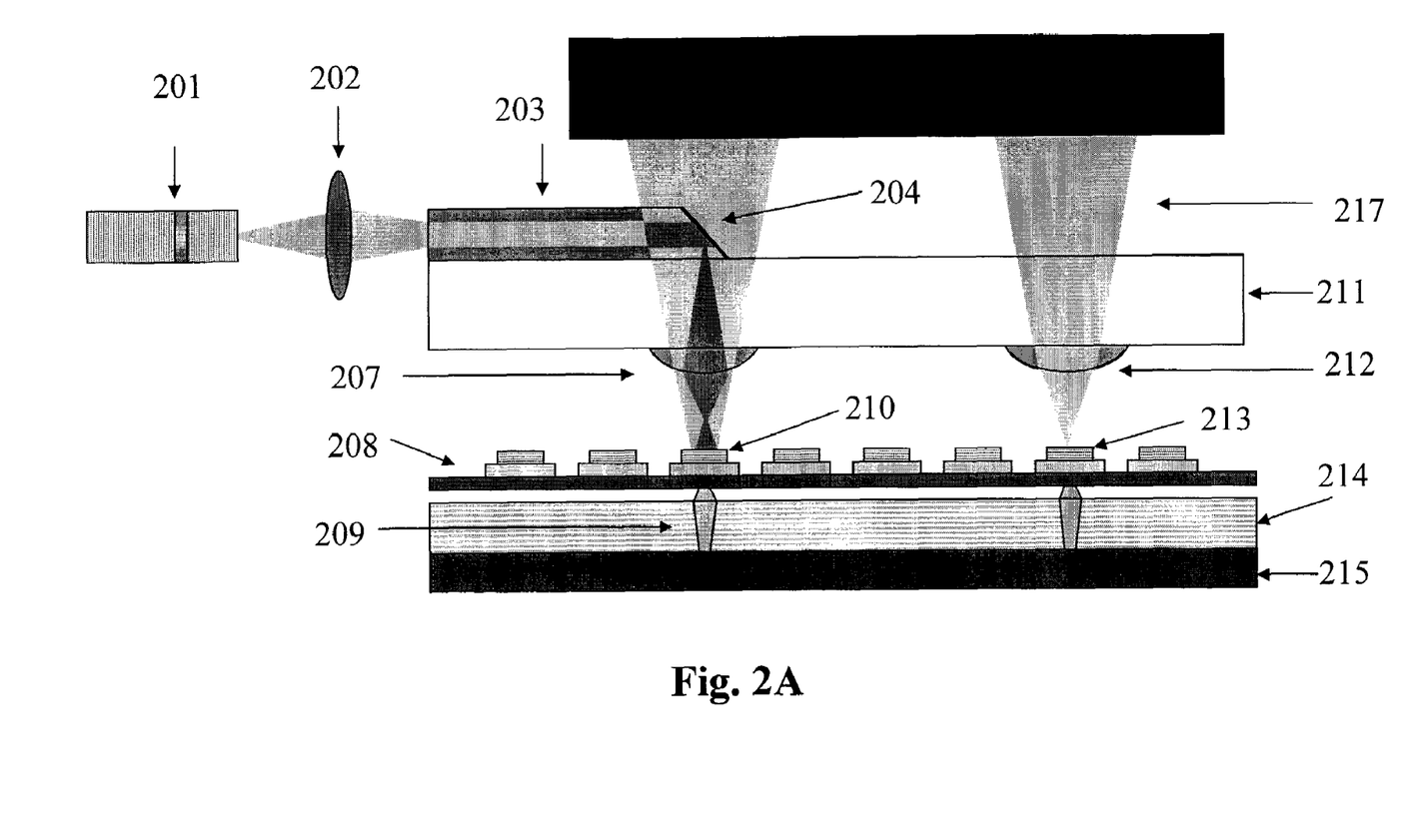
FIG. 2A is an exemplary schematic diagram of a side view of a second embodiment of the apparatus of the disclosure.

In yet another exemplary embodiment of the apparatus of the disclosure, the waveguide and modulator are located relative to one another, as shown in FIG. 2A. In particular, FIG. 2A shows the invention in a free-space interconnect application. In FIG. 2A, an external light source 201 provides an input for the apparatus. Examples of external light sources 201 include, but are not limited to, lasers and LEDs. The external light source 201 is coupled by coupling means 202 to an input optical waveguide 203. Examples of coupling means 202 include, but are not limited to, a ball lens, butt coupling, end fire coupling, thin lens, prism coupling, and grating coupling of the external light source 201 to the input optical waveguide 203. The input optical waveguide 203 has an end-facet 204 located at the end of the input optical waveguide 203 that is opposite the external light source 201. The end-facet 204 is preferably etched at −45° relative to a top surface of the input optical waveguide 203. The external light source 201 is reflected by the end-facet 204 through a substrate 211 and a lens 207 and onto a modulator 210.

The lens 207, as shown in FIG. 2A may include, but is not limited to a microlens. Further, the lens 207 may be designed to couple light from a first optical waveguide 203 to a modulator 210 and back into free-space. The lens 207 is preferably designed to avoid significant obscuration by the end-facet 204. The apparatus of FIG. 2A may use a two-dimensional array of uniform optoelectronic spatial light modulators 208. A plurality of modulators may be biased to perform as a detector 213 for incident light 217 on the modulator biased as a detector 213 from an interconnect system. The apparatus may also include multiple metallization layers 214 below the opto-electronic device layer 208 and include vias 209 and CMOS or other logic type driver circuitry 215 to supply drive current or other signals to the array of modulators 208.

Figure 2B:
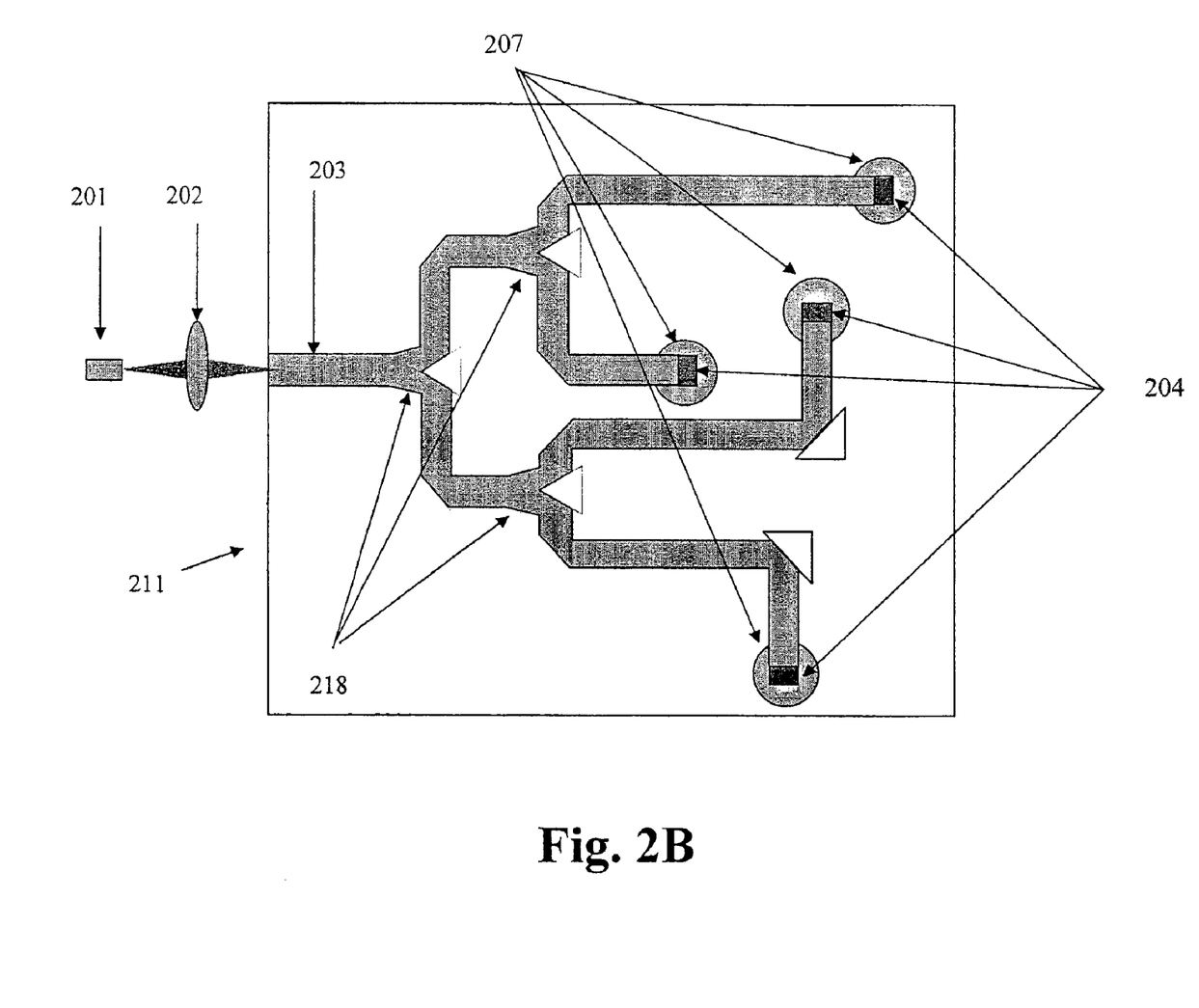
FIG. 2B is an exemplary schematic diagram of a top view of a second embodiment of the apparatus of the disclosure.

Furthermore, a top view of the apparatus is shown in FIG. 2B. In FIG. 2B, light from a continuous wave (CW) external source 201 can be coupled by coupling means 202 into an input waveguide 203 locate on top of a substrate 211. The light from the input waveguide 203 can be coupled to a reflection mode. modulator 210 at an arbitrary location using an etched end-facet 204 and a lens 207 on the bottom of the substrate, as shown in FIG. 2A. When the modulator is "on," the light can be coupled into a free space interconnection system, to a detection point, and collected onto a detector using the lens 212. As shown in FIG. 2B, a single CW source 201 can split 218 into multiple individually addressable, arbitrarily located, effective source points.

Figure 3:
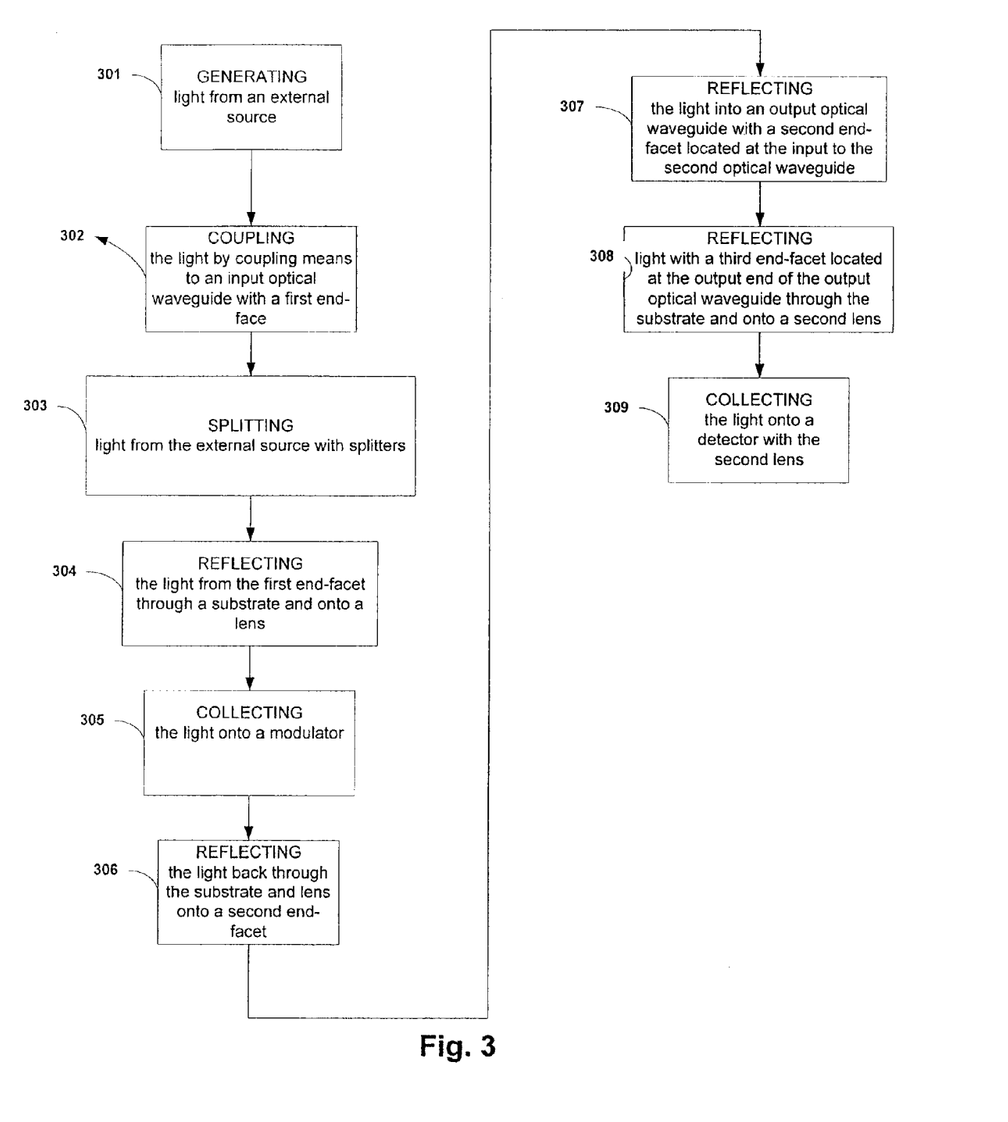
FIG. 3 is an exemplary flow diagram of a first method of the disclosure.

FIG. 3 shows an exemplary flow diagram of a first method of the invention. In particular, FIG. 3 shows how individually addressable photonic sources and detectors for short reach optical interconnects are achieved. FIG. 3, step 301 is generating light from an external light source (e.g., a laser or LED). Step 302 is coupling the light through coupling means to an input optical waveguide, wherein the input optical waveguide has a first end-facet etched at −45° relative to a top surface of the input optical waveguide. Step 303 is splitting the external source using splitters. FIG. 3, step 304 is reflecting the light with the first end-facet through a substrate and a microlens onto a modulator. Step 305 is collecting the light from the microlens onto a modulator. In step 306 of FIG. 3, reflecting the light from the modulator back through the microlens and the substrate into a second end-facet etched at −135° relative to a top surface of an output optical waveguide when the modulator is activated to reflect. It should be noted that the input optical waveguide and the output optical waveguides may be separated by a predetermined gap. Step 307 is reflecting the light into the output optical waveguide with the second end-facet located at the input to the second optical waveguide. Step 308 is reflecting the light with a third end-facet located at the output end of the output optical waveguide through the substrate and onto a second lens. Step 309 is collecting the light onto a detector with the second lens.

Figure 4:
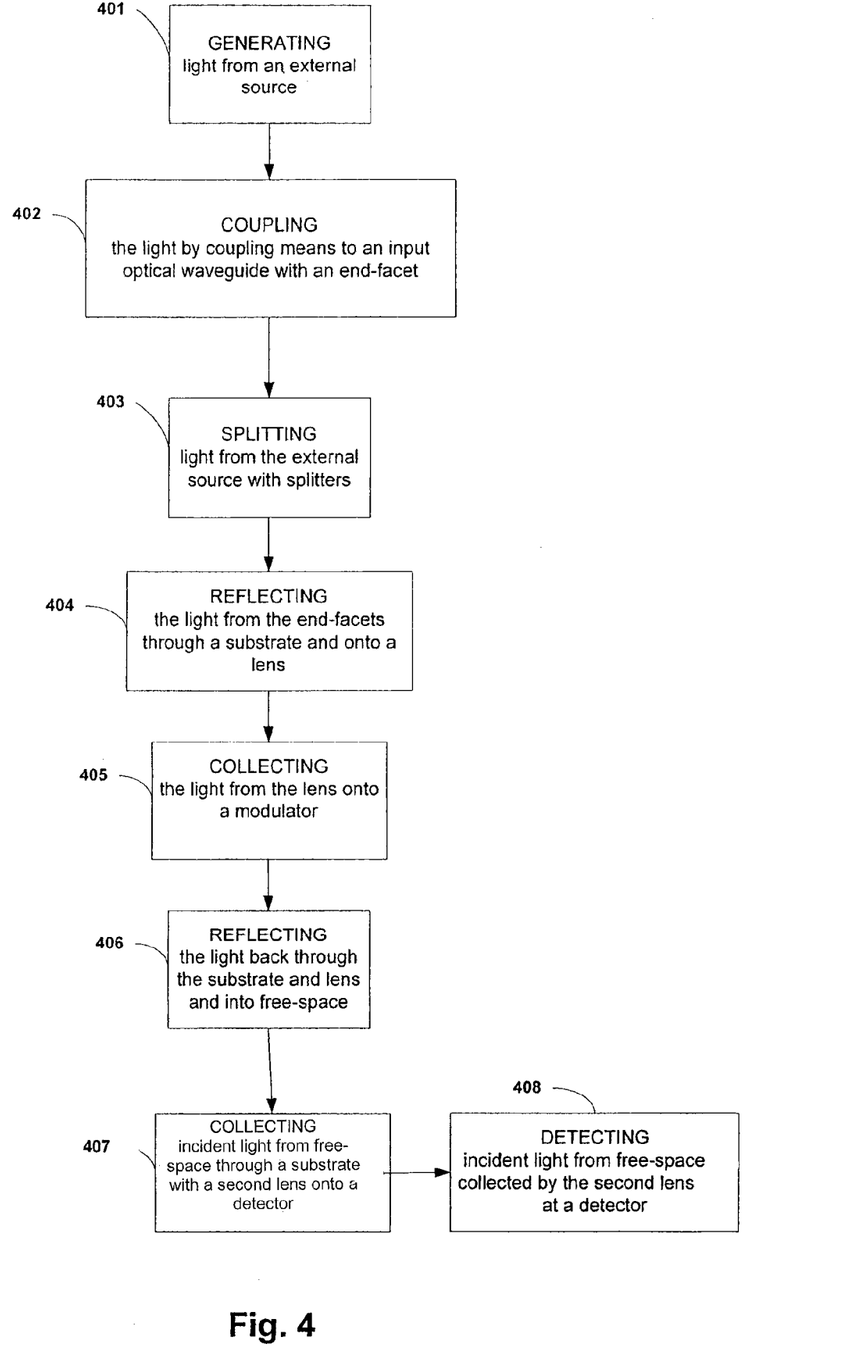
FIG. 4 is an exemplary flow diagram of a second method of the disclosure.

Alternatively, FIG. 4 shows a second flow diagram of an exemplary second method of the invention. In particular, FIG. 4 shows how individually addressable photonic sources and detectors may be achieved for short reach optical interconnects. In FIG. 4, step 401 is generating light from an external light source (e.g., a laser or LED). Step 402, of FIG. 4 is coupling the light through coupling means to an optical waveguide, wherein the optical waveguide has a first end-facet etched at −45° relative to a top surface of the optical waveguide. In step 403, the external light is split using splitters. Step 404 is reflecting the light with the end-facet through a substrate and a microlens onto a modulator, wherein the modulator reflects when active. Step 404 is reflecting the light from the end-facet through a microlens onto a modulator. In FIG. 4, step 405 is collecting the light onto the modulator. Step 406 is reflecting the light back from the modulator and through the microlens and the substrate and into free-space when the modulator is active. Step 407 is collecting light incident on the substrate from free-space with a second lens. Step 408 is detecting the incident light from free-space that is collected by the second lens onto a detector. It should be noted separate modulator and detector types may also be applied with the disclosure.

In contrast to the background art, the disclosure provides space above the plane of the modulators that is not obstructed because waveguides bring light to the position of modulators. Thus, the structure of the disclosure allows seamless integration with free-space and/or guided wave interconnection fabrics.

In contrast with the regular pattern resulting from the background art use of a spot array generator, the disclosure allows arbitrary location of the source points, since waveguides deliver the light to the modulators.

Further, in the disclosure the single CW laser light source can drive multiple effective sources and alleviates the power requirements and thermal effects of an equivalent number surface-emitting lasers or LEDs. Therefore, the disclosure allows for a greater density of photonic/light sources than is possible with surface-emitting lasers or LEDs of the background art. Moreover, the modualtors are typically more reliable than surface-emitting lasers due to the longer mean-time-to-failure and higher fabrication yield (see, for example MQWMs).

Another benefit of the disclosure is that the modulated effective sources have beam/light characteristics comparable with surface-emitting lasers and LEDs. They are surface normal and can be designed to have narrowly diverging beam/light profiles. In addition, using modulators means that high modulation rates do not result in excessive optical output power as is the case with surface-emitting lasers or LEDs. As discussed above, high optical power is not necessary for short reach optical interconnect applications, such as intrachip, or chip-to-chip optical interconnections, but other characteristics, such as reliability, low electrical power consumption, integration density, and heat dissipation are of critical importance.

Moreover, since modulators, microlenses, and etched waveguides, which are highly mature technologies, are the elements of this invention, the cost per unit, as compared to photonic sources such as lasers or LEDs, would be greatly reduced. Also, depending on how they are biased, some modulators, such as MQWMs, can be used as either sources and detectors. Therefore, the cost of the disclosure is further reduced by allowing uniformity in the optoelectronic devices.

Figure 5:
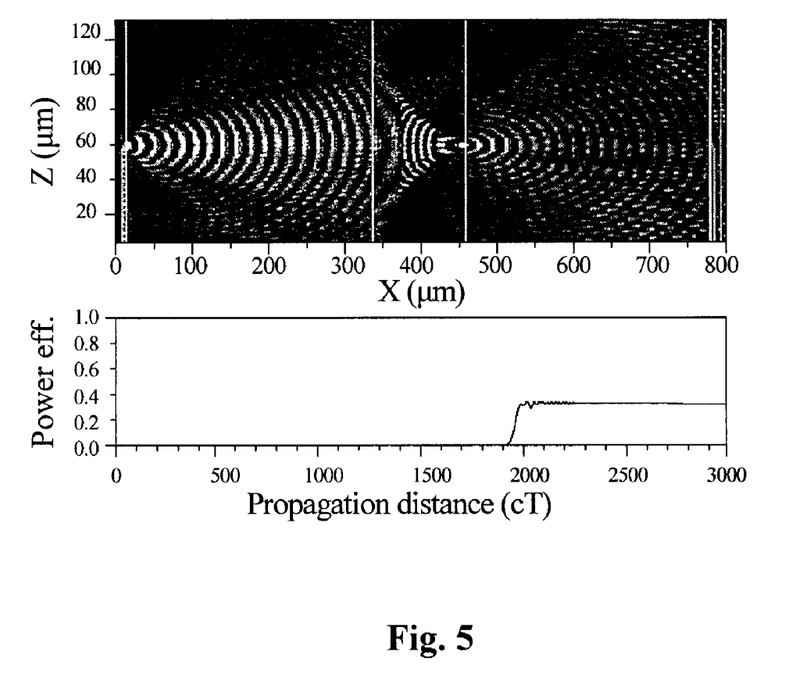
FIG. 5 illustrates test results for the Finite Difference Time Domain (FDTD) electromagnetic propagation analysis of the system.

Finite-Difference Time Domain (FDTD) electromagnetic propagation analysis, as shown in FIG. 5, indicates reasonable efficiency for both proposed structures. It is noted that for a PENCEL structure, the etched end-facet does not significantly impact on the overall optical efficiency, since the spot size at the plane of the etched facet is much larger than the size of the obscuration. Moreover, anti-reflection coating could increase the over-all efficiency.

Figure 6:
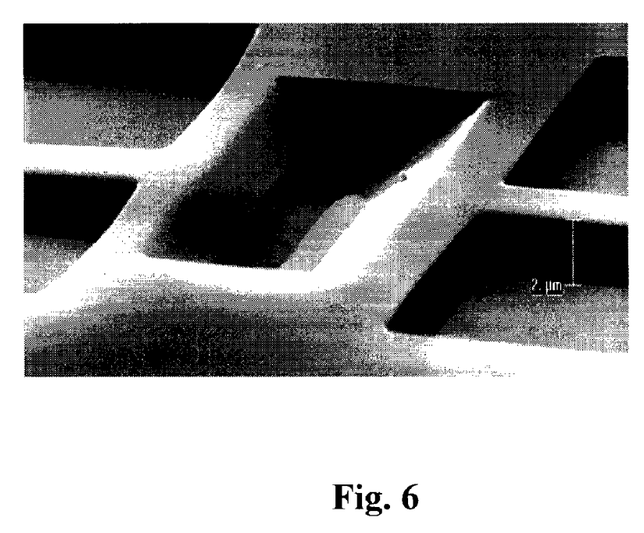
FIG. 6 is a micrograph of etched end-face mirrors in Silicon.

An exemplary end-facet structure is shown in FIG. 6. In FIG. 6, the end-facet structure is fabricated on 2×2-μm rectangular waveguides in Silicon using e-beam direct-write lithography and inductively coupled plasma assisted dry etching. The waveguide fabricated in this non-limiting exemplary structure is a strip waveguide, but in the disclosure my also be implemented using any planar optical waveguide fabricated on an optically-transmitting substrate.

The foregoing description of preferred embodiments of the disclosure provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed as new and desired to be protected by Letters Patent of the United States is:

1. An apparatus for optical interconnect comprising: a substrate;
    An input optical waveguide and an output optical waveguide, each of the input optical waveguide and the output optical waveguide formed on one surface of the substrate; a two dimensional array of at least one of modulators and detectors; and a first lens and a second lens, each of the first lens and the second lens formed on an opposite surface of the substrate and formed proximate to the respective input optical waveguide and output optical waveguide;
    said input optical waveguide has a first end-facet etched at −45 degree relative to a top surface of the input optical waveguide;
    said output optical waveguide has a second end-facet etched at −135 degree at the input end and a third end-facet etched at −45 relative to a top surface of the output optical waveguide at the output end;
    and said second lens collects light reflected from the third end-facet onto a detector.

2. The apparatus of claim 1, wherein the two-dimensional array comprises at least one modulator and at least one detector, the first lens comprises a microlens, and the input optical waveguide is configured to receive a light beam, in which the first end-facet is configured to reflect the light beam through the substrate and the microlens onto one of the modulators, the modulator is configured, when activated, to reflect the light beam back through the microlens and the substrate into the second end-facet, the third end-facet is located at the output end of the output optical waveguide and adapted to reflect the light beam through the substrate and onto the second lens, and the detector is configured to detect the light beam as collected by the second lens.

3. A method for providing an optical interconnect using the apparatus of claim 1 wherein the two-dimensional array comprises modulators and detectors and the first lens comprises a microlens, the method comprising the steps of:
    (a) generating light from an external light source;
    (b) coupling the light through coupling means to the input optical waveguide;
    (c) splitting the external light source using one or more splitters;
    (d) reflecting the split external light source light with the first end-facet through the substrate and the microlens onto one of the modulators;
    (e) when the modulator is activated, reflecting the light from the modulator back through the microlens and the substrate into the second end-facet;
    (h) reflecting the light with the third end-facet located at the output end of the output optical waveguide through the substrate and onto the second lens; and
    (i) collecting the light onto one of the detectors with the second lens.

* * * * *